Figure 1:
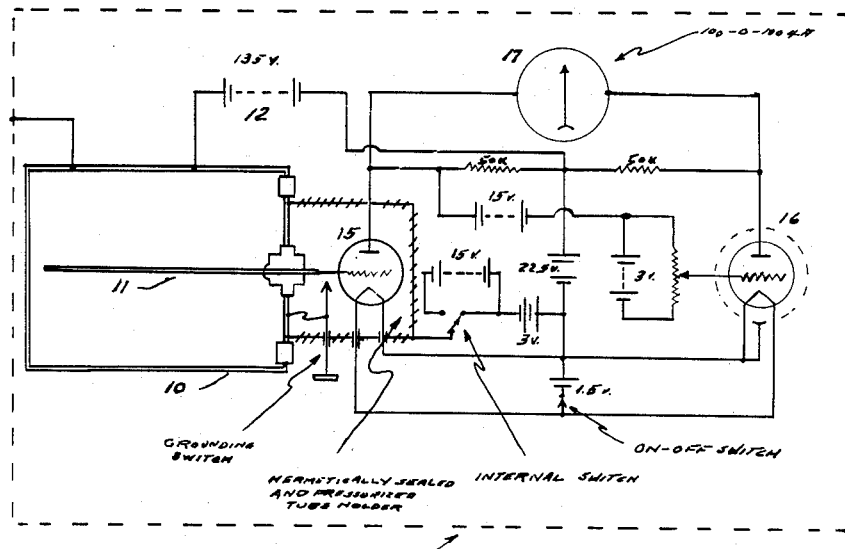

Oct. 25, 1955  W. E. SELL ET AL  2,721,945
GEOPHYSICAL EXPLORATION
Original Filed Nov. 13, 1948

JAMES A. FORRESTER
WAYNE E. SELL
INVENTORS

BY
ATTORNEY

United States Patent Office 2,721,945
Patented Oct. 25, 1955

2,721,945

GEOPHYSICAL EXPLORATION

Wayne E. Sell and James A. Forrester, Coffeyville, Kans., assignors to Research, Inc., Coffeyville, Kans., a corporation of Kansas Continuation of application Serial No. 59,866, November 13, 1948. This application August 9, 1951, Serial No. 241,068

2 Claims. (Cl. 250—83.6)

This invention relates to geophysical exploration and has particular utility as a method for exploring or prospecting for oil deposits and the like. This application is a continuation of application Serial No. 59,866, filed November 13, 1948, now abandoned.

Various methods of geophysical exploration have been proposed heretofore, among them the use of radioactivity measurements. Such measurements, however, have generally involved the taking of samples of earth at varying depths and measuring the radioactivity of the samples; or the boring of holes in the earth, collecting the gases therein and measuring the radioactivity of the gases; or the use of Geiger counters, though the use of such counters has heretofore been confined to the detection of highly radioactive materials such as pitchblende and the like. The enumerated methods, however, have not been found satisfactory in the detection of oil and the like, for various reasons and have not progressed materially beyond the experimental state, although their use goes back several decades.

The radioactivity at the normal earth-air interface where there are no deposits of highly radioactive material underlying the surface, is at a low level, of the order of radiation from $10^{-7}$ grams of uranium per gram of ordinary rock. Variations in this low level radioactivity are so small as to be unsusceptible to differentiation at the earth-air interface with the methods heretofore employed.

One of the objects of this invention is to provide a method of geophysical exploration for oil deposits and the like by radioactivity measurements along the earth-air interface.

Further objects will appear from the following description and accompanying drawing.

In accordance with this invention, generally stated, a method of geophysical explorations for oil deposits and the like is provided in which variations in the radioactivity at the earth-air interface at a low radiation level are measured at a series of locations. The radioactivity at any particular location is measured over a relatively wide area in such a way that local contamination (a term used in this specification to indicate either local shielding or local excessive radioactivity) is minimized, so as to make duplication of the result at any one location possible. The various locations and the intensity of the radioactivity measured thereat are charted and the isodynamous points are connected to define the periphery of deposits of oil and the like. The taking of the measurements above the earth with the top soil undisturbed distinguishes the method of the present invention from those methods of the prior art which involve the digging of holes or the clearing off of the top sol. It has been found that the top 12 to 15 inches of well-weathered soil are most important to the determinations of radioactivity in accordance with this invention. Therefore, while it is not essential in the practice of this invention that the vegetation be untrampled and the topsoil in its virgin state, it is neither necessary nor desirable to clear off the topsoil over the area over which the measurements are to be made. The term "undisturbed" applied to the topsoil in the description and claims is thus a relative one and is used as opposed to "cleared off." The integration of the radioactivity over a relatively wide area (between 25 and 150 feet in radius) distinguishes the method of this invention from the method of prospecting for uranium and the like involving the use of Geiger counters and simple gold-leaf electroscopes, which are responsive to extremely small and localized radioactive deposits, as their use has been contemplated heretofore.

In actual practice about 65% of the wells drilled in accordance with the method of this invention are producing wells, compared with about 20% in the industry generally. At the same time the remaining 35% of the wells in areas determined by this method have reached oil bearing strata but have not produced in what is presently commercial quantity whereas the 80% of dry holes drilled in the industry generally have included a substantial number in which no trace of oil was found.

Figure 2:
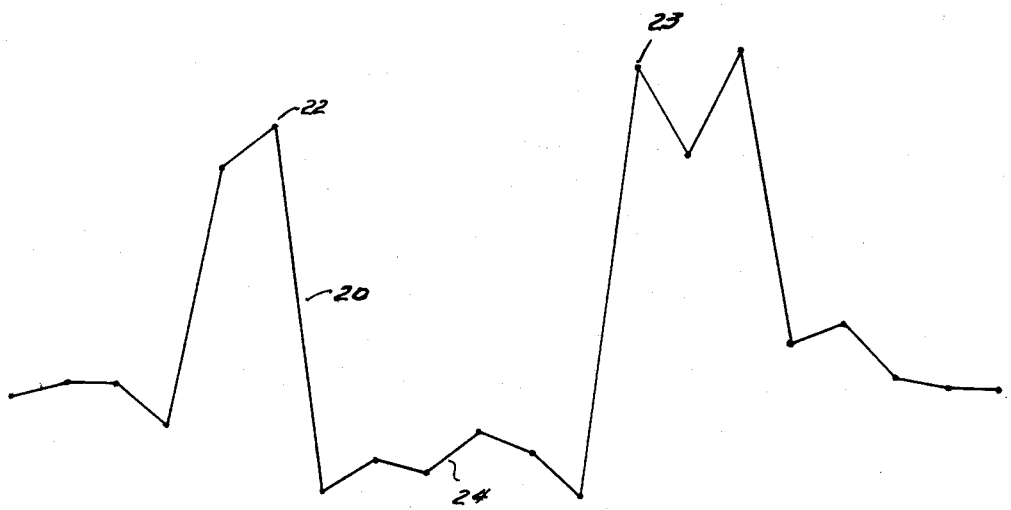

In the accompanying drawing Figure 1 is a schematic view of an apparatus capable of carrying out the method embodying this invention, and Figure 2 is a view showing the correlation of a series of measurements with respect to the locations of a sought-for underlying deposit.

Referring to Figure 1, 10 designates a closed ionization chamber of metal having an electrode 11 therein insulated from the chamber and connected to an input electrometer tube 15. Connected across the chamber and electronic circuit is a source of voltage such as a battery 12 to provide saturation voltage to the chamber. A second vacuum tube 16 is used to provide a stable null circuit with its indicating meter 17. The meter, however, operates as a null indicator in that it measures the time required for a specified charge to be neutralized in the chamber, this time being measured in seconds and fractions thereof. The design of the chamber provides a receptive area of an extent to receive sufficint rays at the low concentration level of the normal earth-air interface to differentiate between variations therein.

A chamber so constructed is sufficiently responsive at a very low radiation level to differentiate between the radioactivity concentrations at different locations. However, at any one location the instrument responds to radiation over a relatively wide area which probably extends to around 150 feet in each direction, but in which the bulk of the effective radiation is within a radius of around 25 feet. This response from radiation over a wide area effectively minimizes the disturbance from local contamination, and makes it possible substantially to reproduce the readings from the instrument at any particular location. Furthermore, the wide area to which the instrument responds serves to provide a certain continuity between the various locations since in practice readings are taken at locations 330 feet apart so that the outermost area affecting the instrument at one location almost overlaps the outermost area affecting the instrument at its next location. The envelope of the chamber is thus of sufficient size to substantially eliminate statistical fluctuation.

The receiver is charged with a suitable gas, such as argon, neon, or hydrogen, at a pressure suitable to provide the required high efficiency. The voltage applied to the ionization chamber by the source 12, is such as to be beyond the saturation point which is the order of 90–135 volts. The leads to the tube 15 are made short and this tube is shielded, all of which can be accomplished by placing the tube close to the ionization chamber. The entire apparatus is also shielded by a metal casing against outside influences, against mechanical injury and so that the apparatus can be set on the ground.

In operation, the instrument is placed at or above the surface of the ground and a number of readings are taken, since, though the readings are generally consistent, anomalies will occasionally occur, or the operator may make a mistaken reading. The reading is in seconds, measuring the time required for a specified charge to be neutralized in the chamber. The apparatus is then moved to another location approximately 100 yards away, and generally on a predetermined line, until the readings along one line have covered a sufficient distance, when a second line of readings may be taken parallel with the first line and so on until a desired area has been covered.

Figure 2 shows a series of readings taken along one line. The jagged line 20 shows the actual readings and these can be averaged by a smooth line. It will be noted that this has two high points, 22 and 23, with a low point, 24. The field explored was an oil field.

It has been discovered that the peripheries of oil deposits are defined by concentrations of radioactivity which, though measurable in accordance with the method of this invention have heretofore been undeterminable by exploration above or at the earth's surface.

In practicing the method of this invention it is desirable to define the entire periphery of the deposit, so as to avoid the possibility that the area of high radioactivity defines an island or a ridge rather than a pool. In general, however, the soil above the pool itself will be relatively uniformly low in radioactivity as compared with the surrounding territory and this fact may be used to advantage where it is not possible for practical reasons to explore the entire periphery of the deposit. Occasionally high concentrations of radioactivity, in the form of "islands" are found over the oil pools, but these anomalies have recognizable character, and, in the practice of this invention described, in which there is substantial continuity of measurement, the definition of the periphery of the deposit is so clear as to make the character of such islands immediately apparent.

It is to be understood that this invention is susceptible of various embodiments within the scope of the appended claims. It will further be understood that any principle of operation and theory of action described is presented to facilitate the disclosure but without restricting the invention.

Having thus described our invention what is claimed and desired to be secured by Letters Patent is:

1. The method of geophysical exploration for a deposit of oil comprising measuring at one location the low-level radiation immediately above the undisturbed surface of the soil over an area sufficiently wide to minimize local contamination to provide a reproduceable measurement, similarly measuring the said low-level radiation at a series of locations, charting said locations and the value of the radiation measured thereat, joining the isodynamous points, and extending the measuring of said radiation over a sufficient territory to define, by the regions of maximum radiation, the periphery of said oil deposit.

2. The method of geophysical exploration for an oil deposit or the like, comprising measuring at a series of locations the low-level radiation of the earth at the undisturbed surface of the soil, the measurement at each of said locations covering an area sufficiently wide to minimize the effect of local contamination to provide a reproduceable measurement, said locations being sufficiently close to one another in at least one direction to provide substantial contiguity between the areas of radiation measured at two successive locations, and charting said locations and the indications of the intensity of the radioactivity thereat to define, by regions of maximum radiation separated by regions of relatively uniform low radiation, the periphery of said deposit.

References Cited in the file of this patent

UNITED STATES PATENTS

| | | |
|---|---|---|
| 2,508,772 | Pontecorvo | May 23, 1950 |
| 2,518,327 | Jahn | Aug. 8, 1950 |
| 2,557,158 | Teichmann | June 19, 1951 |

OTHER REFERENCES

Heiland: Geophysical Exploration, Prentice-Hall Inc., N. Y., 1946, pp. 878–881.

Ridland: Transaction of A. I. M. M. E., vol. 164, pp. 117–124, Geophysics, 1945.

Shrum and Smith: Canadian Journal of Research, vol. 11, pp. 652–657, 1934.